United States Patent [19]

Williams

[11] 3,841,668

[45] Oct. 15, 1974

[54] PIPE COUPLING

[75] Inventor: Robert M. Williams, Davison, Mich.

[73] Assignee: Genova, Inc., Davison, Mich.

[22] Filed: May 21, 1973

[21] Appl. No.: 362,065

[52] U.S. Cl. .............................................. 285/93
[51] Int. Cl. ........................................... F16l 55/00
[58] Field of Search ............................. 285/93, 121

[56] References Cited
UNITED STATES PATENTS

| | | | |
|---|---|---|---|
| 3,594,021 | 7/1971 | Williams | 285/93 |
| 3,637,239 | 1/1972 | Daniel | 285/93 |
| 3,762,059 | 10/1973 | Dawson | 285/93 |

*Primary Examiner*—Patrick D. Lawson
*Attorney, Agent, or Firm*—Olsen and Stephenson

[57] ABSTRACT

A transparent pipe coupling adapted primarily but not exclusively for use with plastic sewer pipe. The coupling can be welded at one end to a first length of plastic pipe and has a seal ring in an annular groove in the other end so that a second length of pipe can be inserted therein to provide an expansion joint. The transparent coupling has indicia thereon to enable positioning of the second length of pipe at a proper location in accordance with the ambient temperature. The transparent qualities of the coupling also permit proper inspection of the seal ring before and after insertion of the second pipe.

5 Claims, 2 Drawing Figures

PIPE COUPLING

BACKGROUND OF THE INVENTION.

The present invention relates to a pipe coupling for use primarily with plastic sewer pipe or other similar pipe adapted to be laid or installed where expansion joints are required.

It is conventional practice to form joints wherein a socket is formed from the pipe itself under the influence of heat and through use of an expanding mandrel. When using opaque and expanded couplings of this character another pipe can be inserted into the expanded coupling to a required depth of entry only by measuring and marking the required depth on the end of the pipe. This procedure lends itself to improper installations, and it also creates additional problems because the proper depth of entry is a function of the ambient temperature. The thermal coefficient of expansion of the plastic pipe is a significant factor that must be considered when installing the sewer pipe so that expansion and contraction will be provided without risk of disengagement or bottoming-out of the assembled lengths of pipe. Another problem that sometimes arises occurs in connection with the seal ring which may be displaced inadvertently either before or after installation of the second length of pipe. If this occurs and the installer does not detect it at the time of installation, the faulty joint will not be detected until later when pressure tests are made of the completely assembled pipe system. A difficult and time consuming problem then will exist of locating where the leak or faulty connection may be. It will be recognized that when opaque connections of the type found in the prior art are used, the installer cannot see the seal ring nor the end of the inserted pipe, and he has very little opportunity of knowing if a faulty connection has been made except through subsequent testing of the completely assembled pipe system.

SUMMARY OF THE INVENTION.

The present invention has overcome the inadequacies of the prior art and provides an improved pipe coupling which is constructed and arranged so that an expansion joint can be provided which will assure that the second pipe inserted into the coupling can always be located in the optimum position with reference to the ambient temperature and so that the seal ring can be inspected before and after insertion of the second pipe into the coupling. The pipe coupling is transparent and has suitable indicia thereon to permit the man in the field to make proper installations and to determine the setting of the pipe and to inspect the seal ring visually. Further, after the complete string of pipes has been assembled, they can readily be inspected to assure that all connections of the pipe coupling have been properly made.

According to one form of the present invention, a pipe coupling is provided for connecting two pipes comprising a transparent cylinder which has an internal bore interrupted between its ends by a radially inwardly directed shoulder so that one of the pipes can be inserted into one end of the bore and secured therein by welding in engagement with the shoulder. The bore has adjacent to its other end a radially outwardly directed seal ring groove defined by an annular radially outward projection in the cylinder. The groove has a generally rectangular cross-section, and a seal is located in the groove so that the second pipe can be inserted into the other end of the bore for axial movement and in a sealed relationship. The seal ring is an elastomeric member of generally C-shape in cross-section with the opening of the C-shape facing in an axially inward direction. The transparent cylinder allows inspection of the seal ring before and after insertion of the second pipe and has indicia axially spaced thereon for indicating the proper location for insertion of the end of the second pipe in accordance with ambient temperature.

Thus, it is an object of the present invention to provide an improved pipe coupling for use in connecting lengths of plastic pipe, and especially for use in connection with sewer pipe or water main.

Other objects of this invention will appear in the following description and appended claims, reference being had to the accompanying drawings forming a part of this specification wherein like reference characters designate corresponding parts in the several views.

Figure 1:
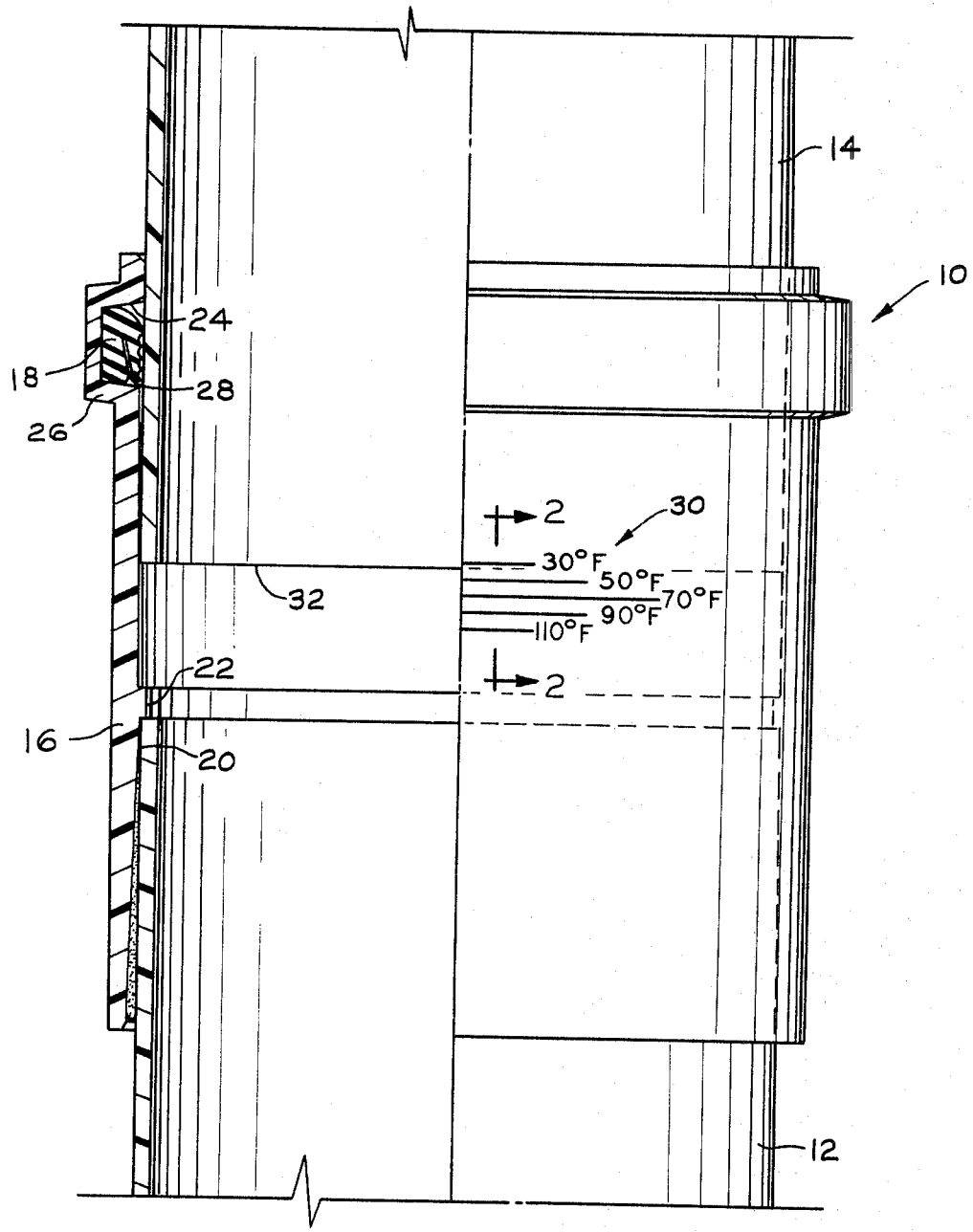
FIG. 1 is a top plan view with a portion in horizontal section, showing a pipe coupling embodying the invention connecting first and second lengths of plastic pipe.
Figure 2:
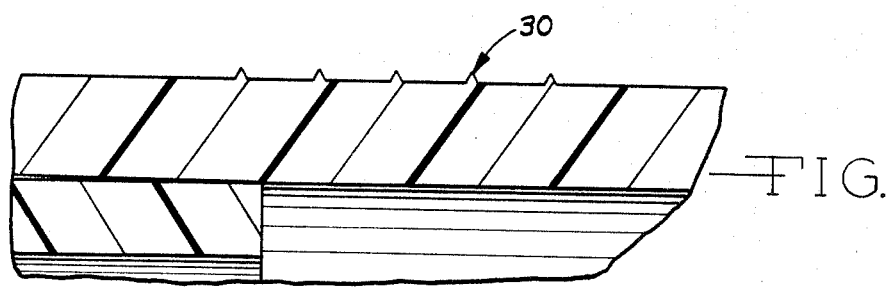
FIG. 2 is an enlarged fragmentary section taken on the line 2—2 of FIG. 1.

DESCRIPTION OF THE PREFERRED EMBODIMENT.

Before explaining the present invention in detail, it is to be understood that the invention is not limited in its application to the details of construction and arrangement of parts illustrated in the accompanying drawing, since the invention is capable of other embodiments and of being practiced or carried out in various ways. Also, it is to be understood that the phraseology or terminology employed herein is for the purpose of description and not of limitation.

Referring now to the drawing, the invention will be described in greater detail. The pipe coupling 10 is shown positioned between the one or first length of pipe 12 and the other or second length of pipe 14. The pipes 12 and 14 are conventional organic plastic pipe that are opaque. The pipe coupling 10 is made of a clear plastic material that is transparent.

The transparent pipe coupling 10 includes the transparent cylinder 16 and the seal ring 18 which preferably is made from a suitable elastomeric material. The transparent cylinder 16 has an internal bore 20 that is interrupted between its ends by a radially inwardly directed shoulder 22 so that the pipe 12 can be inserted therein into abutting relationship with the shoulder 22, and it will be solvent welded to the pipe 14, as is shown. The bore 20 has adjacent to its other end a radially inwardly opening sealing ring groove 24 which is defined by the annular radially outward projection 26 that is an integral part of the wall of the cylinder 16.

The seal ring 18 that is located in the annular groove 24 is an elastomeric member of generally C-shape in cross-section with the opening 28 of the C-shape member facing axially inwardly or in the direction of the shoulder 22. In the disclosed embodiment, the elastomeric seal ring 18 is made of nitrile rubber, selected for low compression set and optimum resistance to attack by chemicals and water. The C-shape configuration is such that it provides an effective seal at low or even negative pressures, but develops increased sealing action under rising pressure.

In the normal use of the present invention, the pipe coupling 10 will be welded to the length of pipe 12 at controlled conditions at the plant before shipment. The exposed female or other end of the coupling which incorporates the seal ring 18 will then be ready to receive the other or second pipe 14 at the site of installation.

A significant feature of the pipe coupling 12 is the indicia or reference lines 30 inscribed or formed in axially spaced relation on the outer surface of the cylinder 16 between the shoulder 22 and the annular groove 24. It will be noted from FIG. 1 that each of the lines has temperature markings so that when inserting the pipe 14 into the coupling 12 the end 32 will be moved to the temperature indicating position of the indicia 30 corresponding to the ambient temperature. These reference lines have been positioned to indicate the optimum position for the end 32 of the pipe when inserted into the pipe coupling 10 so that the maximum possibility for expansion and contraction caused by temperature changes is afforded without risk of disengagement or bottomingout of the pipe 14.

Thus, the transparent qualities of the coupling 10 together with the indicia 30 enable the worker in the field to quickly assemble the pipe 14 and coupling 10, and the worker can do this with assurance that the connection has been properly made. Not only will the worker be assured that the pipe 14 has been inserted the proper distance into the coupling, but he can also inspect the seal ring 18 before and after insertion of the pipe 14 to be sure that a proper seal will be obtained. If a faulty seal is indicated through visual inspection, the pipe 14 can be removed immediately and the fault can be corrected or other suitable action can be taken before continuing the string of pipes. Likewise, the solvent weld interface between pipe 12 and coupling 10 can be checked by visual inspection for continuity.

It is claimed:

1. A coupling for connecting two pipes comprising a transparent cylinder which has an integral bore interrupted between its ends by a radially inwardly directed shoulder so that one of said pipes can be inserted into one end of the bore and secured therein in engagement with said shoulder, said bore having adjacent to its other end a radially inwardly opening sealing ring groove, and a seal ring in said groove so that the other of said pipes can be inserted into the other end of the bore in an axially movable and sealed relationship and the end of the second pipe will be visible through the transparent cylinder to indicate its position, said seal ring being visible through the transparent cylinder to allow inspection for proper position of the seal ring before and after insertion of said other pipe.

2. A coupling for connecting two pipes comprising a transparent cylinder which has an integral bore interrupted between its ends by a radially inwardly directed shoulder so that one of said pipes can be inserted into one end of the bore and secured therein in engagement with said shoulder, said bore having adjacent to its other end a radially inwardly opening sealing ring groove, and a seal ring in said groove so that the other of said pipes can be inserted into the other end of the bore in an axially movable and sealed relationship and the end of the second pipe will be visible through the transparent cylinder to indicate its position, said transparent cylinder having indicia axially spaced between said groove and said shoulder for indicating the proper position for insertion of said other pipe in accordance with the ambient temperature at the time of installation.

3. A coupling for connecting two pipes comprising a transparent cylinder which has an integral bore interrupted between its ends by a radially inwardly directed shoulder so that one of said pipes can be inserted into one end of the bore and secured therein in engagement with said shoulder, said bore having adjacent to its other end a radially inwardly opening sealing ring groove, and a seal ring in said groove so that the other of said pipes can be inserted into the other end of the bore in an axially movable and sealed relationship and the end of the second pipe will be visible through the transparent cylinder to indicate its position, said groove having a generally rectangular cross-section and said seal ring is an elastomeric member which has a generally C-shape in cross-section, the opening of the C-shape facing in an axially inward direction toward said shoulder.

4. The coupling that is defined in claim 3, wherein said groove is defined by an annular radially outward projection in the cylinder, said seal ring being visible through the transparent cylinder to allow inspection for proper position of the seal ring before and after insertion of said other pipe.

5. A coupling for connecting two pipes comprising a transparent cylinder which has an internal bore interrupted between its ends by a radially inwardly directed shoulder so that one of said pipes can be inserted into one end of the bore and secured therein in engagement with said shoulder, said bore having adjacent to its other end a radially outwardly directed seal ring groove defined by an annular radially outward projection in said cylinder, said groove having a generally rectangular cross-section, and a seal in said groove so that the other of said pipes can be inserted into the other end of the bore in an axially movable and sealed relationship, said seal ring being an elastomeric member of generally C-shape in cross-section with the opening of the C-shape facing in an axially inward direction, said transparent cylinder allowing inspection of the seal ring before and after insertion of said other pipe and having indicia axially spaced thereon for indicating the proper position for insertion of said other pipe in accordance with the ambient temperature at the time of insertion.

* * * * *